(12) United States Patent
Mitsui et al.

(10) Patent No.: US 7,533,926 B2
(45) Date of Patent: May 19, 2009

(54) ROLLER ARM UNIT FOR VEHICLE SLIDING DOOR

(75) Inventors: Jiro Mitsui, Yamanashi-ken (JP); Yousuke Matsuda, Yamanashi-ken (JP); Hiroshi Satoh, Yamanashi-ken (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 11/165,583

(22) Filed: Jun. 24, 2005

(65) Prior Publication Data

US 2006/0181109 A1    Aug. 17, 2006

(30) Foreign Application Priority Data

Jun. 24, 2004    (JP) .............................. 2004-186367

(51) Int. Cl.
   *B60J 5/06* (2006.01)
(52) U.S. Cl. ...................... 296/155; 296/146.4; 49/358; 49/360
(58) Field of Classification Search ................. 296/155, 296/146.4; 49/358, 360
   See application file for complete search history.

(56) References Cited

U.S. PATENT DOCUMENTS

| 6,530,619 | B2 * | 3/2003 | Fukumoto et al. ............ 296/155 |
| 6,659,539 | B2 * | 12/2003 | Yogo et al. .................... 296/155 |
| 6,935,071 | B2 * | 8/2005 | Yokomori et al. ............. 49/360 |
| 2004/0070231 | A1 * | 4/2004 | Yogo et al. ................... 296/155 |

* cited by examiner

*Primary Examiner*—Jason S Morrow
(74) *Attorney, Agent, or Firm*—Browdy and Neimark, P.L.L.C.

(57) ABSTRACT

A roller arm unit of the present invention has three or more pulleys by odd pieces. A door-opening cable and a door-closing cable extending from a power unit have tip ends fixed to a first and second end portions of a guide rail by way of the pulleys. The door-opening cable and the door-closing cable are intersected with each other between two neighboring pulleys. A path length of a take-up side cable becomes short and a path length of a pay-out side cable becomes long when the roller arm unit is caused to be swung due to influence of the curved portion.

4 Claims, 5 Drawing Sheets

ROLLER ARM UNIT FOR VEHICLE SLIDING DOOR

FIELD OF THE INVENTION

This invention relates to a roller arm unit for a vehicle sliding door and, more particularly to a cable pulley provided at a roller arm unit.

DESCRIPTION OF THE RELATED ART

FIGS. 1 and 2 show a conventional basic arrangement relationship of a vehicle body A and a sliding door B. A lower guide rail D is fixed in the vicinity of a lower part of an ingress/egress aperture C of the vehicle body A, and a center guide rail F is fixed on a quarter panel E of the vehicle body A. The sliding door B has a lower roller arm G slidably engaged with the lower rail D and a center roller arm H slidably engaged with the center rail F. Roller arms G and H are swingably mounted on the sliding door B. The sliding door B is slidably in a door-opening direction and in a door-closing direction through the slidable engagement between these roller arms and rails.

A power unit J of a powered slide device for moving the sliding door B may be disposed on the vehicle body A or, as shown in Figures, in an inner space of the sliding door B. In the latter case, as shown in FIGS. 1 to 3, two wire cables, that is, a door-opening cable K' and a door-closing cable K" are extending from the power unit J. Tip ends of the opening cable K' and the closing cable K" are anchored to positions in the vicinity of rear and front end portions of the center rail F, respectively, by way of a pulley L of the center arm H. When the power unit J is actuated to open the door, the opening cable K' is taken up and the closing cable K" is payed out, and the sliding door B is then moved in a door-opening direction (rightward in FIG. 1) . When the power unit J is actuated to close the door, the closing cable K" is taken up and the opening cable K' is payed out, and the sliding door is then moved in a door-closing direction. At this time, since the take-up amount of the cable wound by a wire drum of the power unit J is equal to the payed out amount of the other cable released from the wire drum, the total cable length of two wire cables extending from the power unit J does not change even if the sliding door B is moved.

Incidentally, as shown FIG. 3, the center roller arm H swingably mounted on the sliding door B with a supporting shaft M is caused to swing counterclockwise about the shaft M due to influence of a curved portion N formed in the front portion of the center rail F when the sliding door B moves in the opening direction, and caused to swing clockwise when the sliding door B moves in the closing direction.

In the above prior art, when the center roller arm H swings around the curved portion N, the path length (hereinafter, it designates the path length between the roller arm H (pulley L) and the door B unless special references are made) of the take-up side cable becomes longer, and the path length of the payed-out side cable shorter. And the increasing amount of the path length of the take-up side cable and the decreasing amount of the path length of the pay-out side cable are not matched with each other. Thus, the balance between the increasing and decreasing amounts of the path length is lost, and the smooth movement of the sliding door B will be obstructed.

On the contrary, U.S. Pat. No. 6,530,619 discloses another roller arm H, as shown in FIG. 4, on which two pulleys L' and L" are provided. The opening cable K' and the closing cable K" are intersected with each other between the pulleys L' and L" so that the total amount of the path length of the take-up side cable and the path length of the payed-out side cable does not change even if the roller arm H is swung.

In the above configuration, for example, when the roller arm H is swinging counterclockwise in response to the door-opening movement of the sliding door B, a contact surface (a take-up side contact angle) between the second pulley L" and the opening cable K' as a take-up cable becomes gradually larger, and a contact surface (a payed-out side contact angle) between the second pulley L" and the closing cable K" as a pay-out cable becomes gradually smaller. Although the increase and decrease of the path lengths are not prevented, there is a good balance between the increase of the take-up side contact angle in respect to the second pulley L" and the decrease of the pay-out side contact angle in respect to the second pulley L". Therefore, a substantive fluctuation of total path length is prevented.

In the configuration of FIG. 4, like the configuration of FIG. 3, the path length of the take-up side cable becomes longer and the path length of the payed-out side cable becomes shorter in response to the movement of the sliding door B around the curved portion N. The take-up side cable essentially becomes shorter as much as the take-up amount of the cable wound by the wire drum of the power unit J, and the sliding door B is moved by the shortening length. However, when the path length of the take-up side cable becomes longer in response to the sliding movement of the door around the curved portion, the take-up side cable is pulled regardless of the take-up amount of the cable wound by the wire drum, and this pulling force acts as rotational load of the wire drum. Therefore the smooth movement of the sliding door B will be obstructed, and the power unit J requires additional power to overcome the rotational resistance.

SUMMARY OF THE INVENTION

Therefore, it is an object of the present invention to provide a roller arm unit in which undesirable load is applied to a wire drum when the roller arm unit is caused to be swung due to influence of a curved portion of guide rail.

DESCRIPTION OF THE PREFERRED EMBODIMENTS

Figure 1:
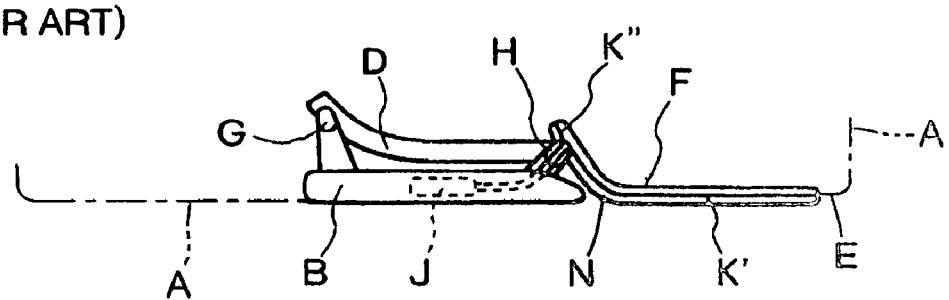
FIG. 1 is a view showing a conventional basic relationship between a vehicle body and a sliding door, in which the sliding door is in a closed state.
Figure 2:
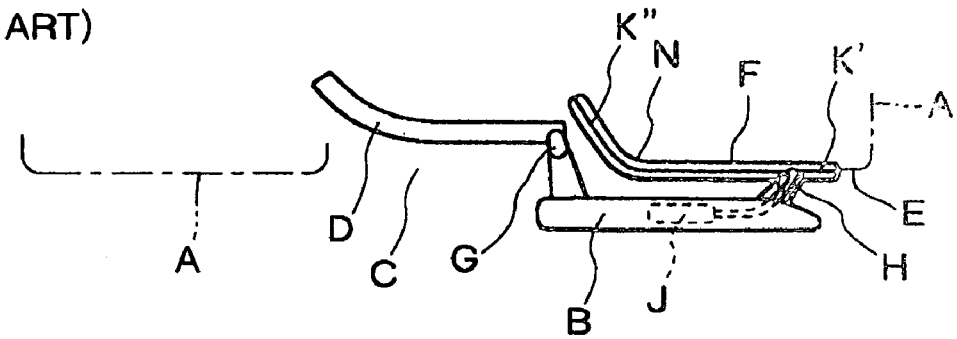
FIG. 2 is a view showing the conventional basic relationship between the vehicle body and the sliding door, in which the sliding door is in an open state.
Figure 3:
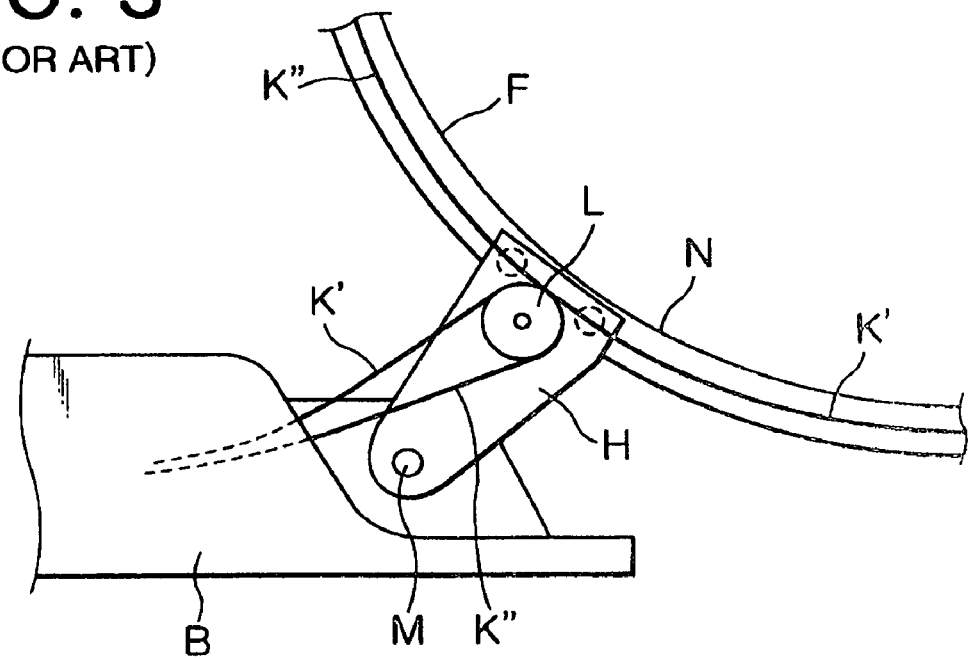
FIG. 3 is an enlarged view showing a conventional roller arm.
Figure 4:
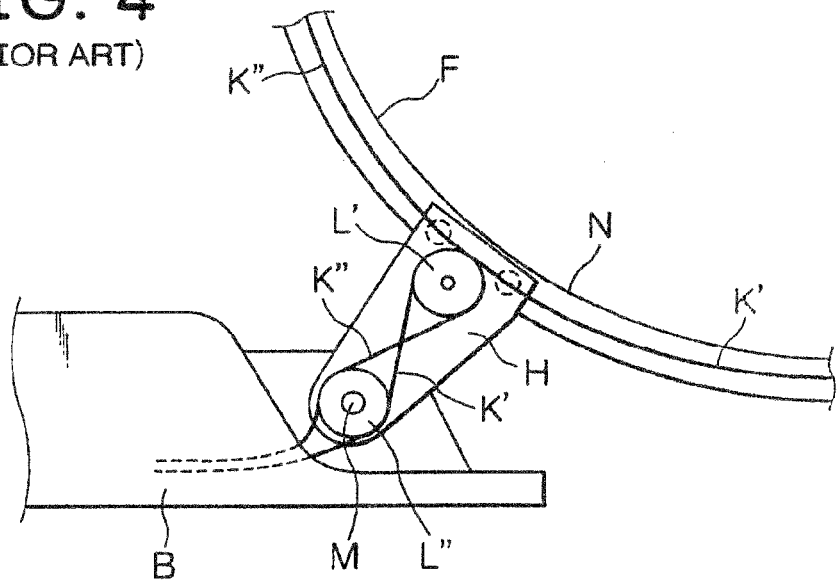
FIG. 4 is an enlarged view showing another conventional roller arm.
Figure 5:
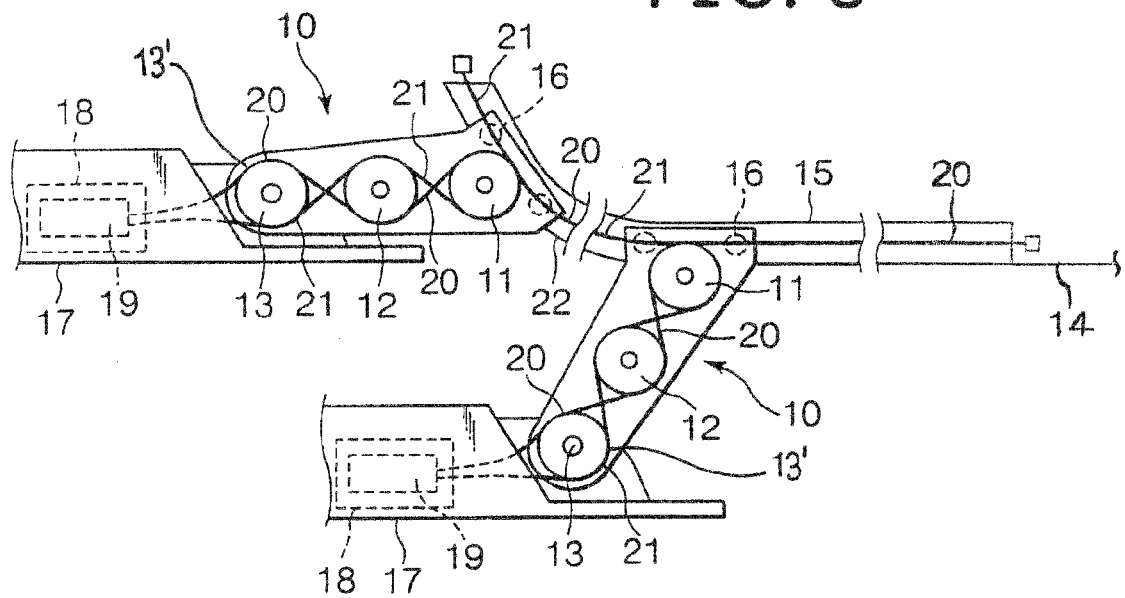
FIG. 5 is a schematic view showing a roller arm unit in accordance with the present invention.
Figure 6:
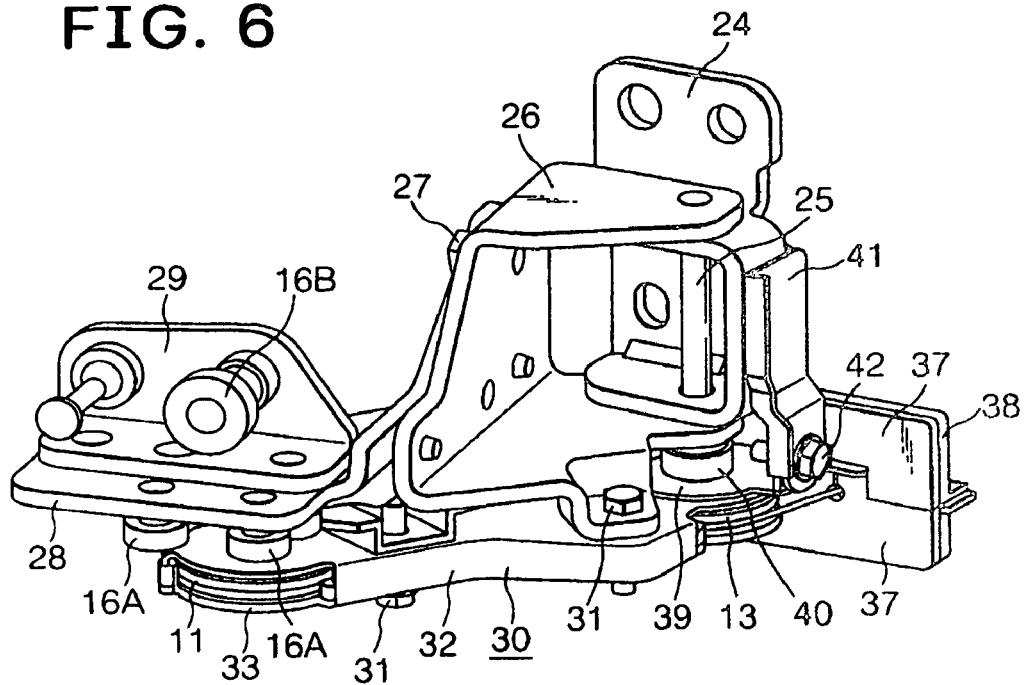
FIG. 6 is a perspective view of the roller arm unit as a whole of the present invention.
Figure 7:
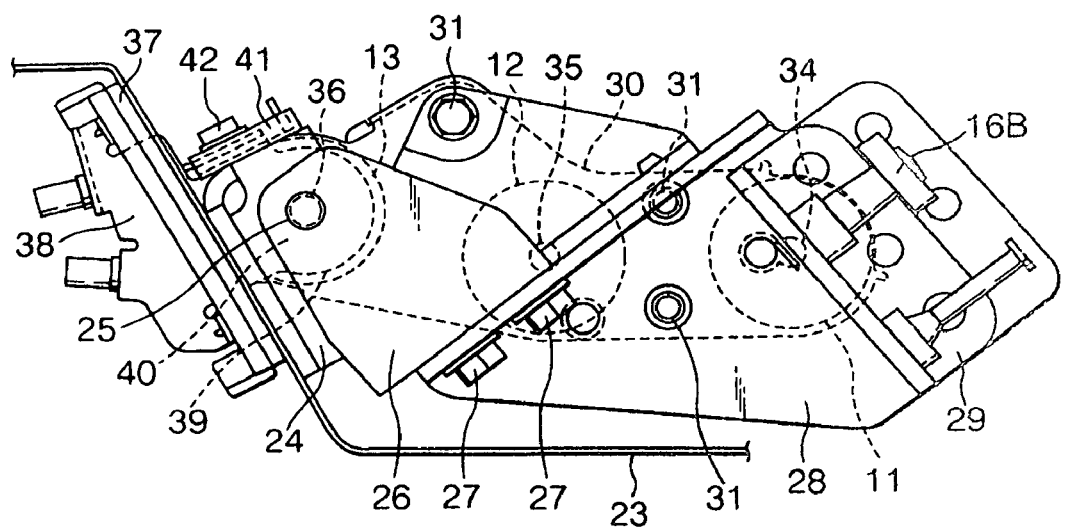
FIG. 7 is a plan view of the roller arm unit of the present invention.
Figure 8:
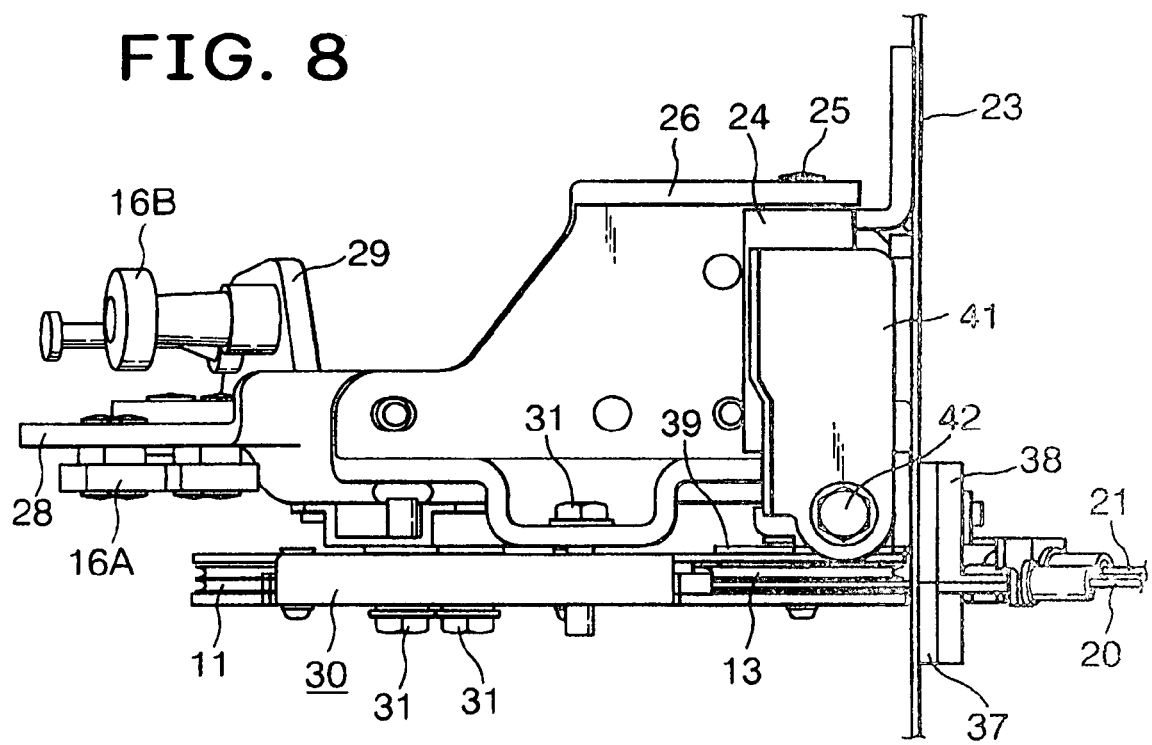
FIG. 8 is a side view of the roller arm unit of the present invention.
Figure 9:
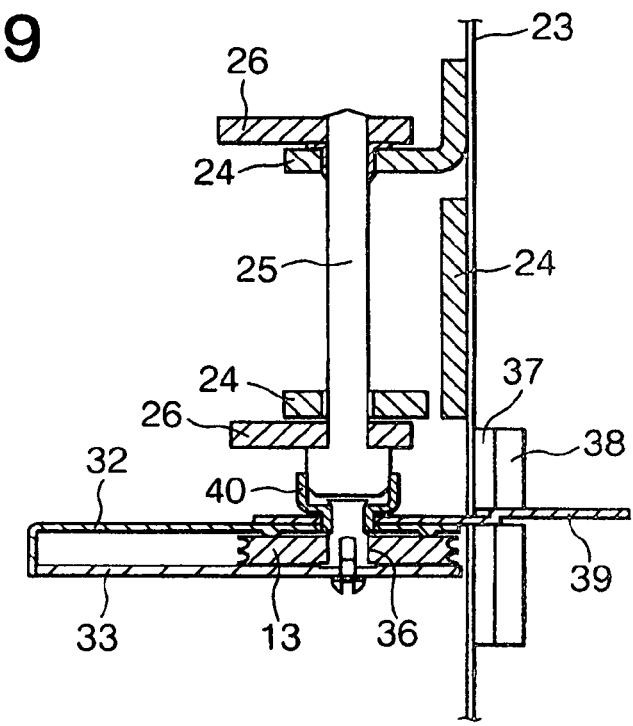
FIG. 9 is a vertically sectional view of the roller arm unit of the present invention.

The preferred embodiment of the present invention will now be explained with reference to the drawings. FIG. 5 shows a schematic view of a roller arm unit 10 for a sliding door in accordance with the present invention. A plurality of pulleys 11, 12, and 13 (odd pieces of pulleys more than three, and preferably three pulleys) are rotatably mounted on the roller arm unit 10. The roller arm unit 10 is the so-called center roller arm unit. Roller member 16 is rotatably mounted on the front side of the roller arm unit 10 and slidably engaged with a guide rail 15 fixed to a vehicle body 14. The roller arm unit 10 is rotatably mounted on the sliding door 17 so that the rotation axis of arm unit is coaxial with the rotation axis of the third roller 13. A power unit 18 of a powered sliding device is provided within the inner space of the sliding door 17. The power unit 18 has a wire drum 19 rotated by a motor. Base side portions of a door-opening cable 20 and a door-closing cable 21 are wound onto the wire drum 19. A tip end of the opening cable 20 is extended backward along the guide rail 15 after passing on the pulleys 11, 12 and 13, and is then fixed to a portion of the vehicle body in the vicinity of a rear end portion of the guide rail 15. A tip end of the closing cable 21 is extended frontward along the guide rail 15 after passing on the pulleys 11, 12 and 13, and is then fixed to a portion of the vehicle body in the vicinity of a front end portion of the guide rail 15.

It is possible that the roller arm unit 10 is rotatably mounted on the vehicle body 14 instead of the sliding door 17. In this configuration, the guide rail 15 is fixed onto the sliding door 17 and the power unit 18 is provided on the vehicle body 14. That is, in FIG. 5, reference numeral 14 designates the sliding door, and reference numeral 17 designates the vehicle body.

The door-opening cable 20 and the door-closing cable 21 are intersected with each other between the first pulley 11 and the second pulley 12 and also intersected with each other between the second pulley 12 and the third pulley 13.

The center roller arm unit 10 is caused to be swung counterclockwise in FIG. 5 due to influence of a curved portion 22 formed in the guide rail 15 when the sliding door 17 moves in the opening direction, and caused to be swung clockwise when the sliding door 17 moves in the closing direction. And, when the door 17 is moving in the opening direction, a contact surface (a take-up side contact angle) between the lower portion of the rim 13' of the third pulley 13 and the opening cable 20 as shown in FIG. 5 as a take-up side cable and the lower contact surface become gradually smaller as the roller unit 10 moves around the curved portion 22, and when the door 17 is moving in the closing direction, a contact surface (a payed-out side contact angle) between the upper portion of the rim 13' of the third pulley 13 and the closing cable 21 as a payed-out side cable and the upper contact surface become gradually larger as the roller unit 10 moves around the curved portion 22. Therefore, each of path lengths (hereinafter, it designates the path length between the roller arm unit 10 (first pulley 11) and the door 17 unless special references are made) becomes longer or shorter when moving around curved portion 22. Thus, in the present invention, the take-up side cable becomes shorter in comparison to the prior art device when the roller arm unit 10 is swung due to movement around the curved portion 22, and since there is a good balance between the decrease of the take-up side contact angle in respect to the third pulley 13 and the increase of the payed-out side contact angle in respect to the third pulley 13, a substantive fluctuation of total path length is prevented like the prior art device.

FIGS. 6-9 show a concrete configuration of the roller arm unit 10. A hinge bracket 24 is fixed to a panel 23 of the sliding door 17 (or vehicle body 14) with screws or the like. A base portion of a first arm plate 26 of the roller arm unit 10 is pivotally mounted on the hinge bracket 24 with the hinge shaft 25, and a second arm plate 28 is fixed to the front side of the first arm plate 26 with bolts 27. Vertical spindle rotary rollers 16A constituting the roller member 16 are rotatably mounted on the under surface of the second arm plate 28. An L-shaped auxiliary plate 29 is fixed to the top surface of the second arm plate 28, and a horizontal spindle rotary roller 16B is rotatably mounted on a vertical wall of the auxiliary plate 29.

A pulley unit 30 is fixed to the lower portion of the roller arm unit 10 with screws 31. The pulley unit 30 has an upper case 32 and lower case 33, and said pulleys 11, 12 and 13 are rotatably supported inside the pulley unit by pulley shafts 34, 35 and 36, respectively. The arrangement of the pulleys 11, 12 and 13 may be comparatively free as long as both the door-opening cable 20 and the door-closing cable 21 always come into contact with each of pulleys 11, 12 and 13. Thus, it is not necessary to align the pulleys 11, 12 and 13.

A cable holder 38 is attached to an inner surface of the panel 23 through a rubber seal 37, and a base or inner side portion of the pulley bracket 39 is fixed to the cable holder 38. A front or outer side portion of the pulley bracket 39 is fixed to the upper case 32. The pulley bracket 39 is fixedly provided with a vertically extending support cylinder 40. Into a lower portion of the support cylinder 40, the third pulley shaft 36 of the third pulley 13 is rotatably inserted, and the lower portion of the hinge shaft 25 is rotatably inserted into the upper portion of the support cylinder 40. Thereby, the third pulley shaft 36 and the hinge shaft 25 are held on the same axis.

An upper portion of a reinforcing plate 41 is fixed to the hinge bracket 24 by welding or the like, and an lower portion of the reinforcing plate 41 is fixed to the pulley bracket 39 by a screw 42 or the like.

This invention has the above-mentioned configuration, and when assembling it, first, the base portion of the first arm plate 26 of the roller arm unit 10 is rotatably mounted on the hinge bracket 24 by the hinge shaft 25, and the upper portion of the support cylinder 40 is engaged with the lower part of the hinge shaft 25 while the inner side portion of the pulley bracket 39 fixed to the pulley unit 30 is inserted inside the panel 23 through the opening of the panel 23, and the inner side portion of the pulley bracket 39 is then fixed to the cable holder 38. Subsequently, the pulley unit 30 is attached to the first arm plate 26 with screws 31, the upper portion of the reinforcing plate 41 is fixed the hinge bracket 24 by welding or the like, and the lower portion of the reinforcing plate 41 is then attached to the pulley bracket 39 by screw 42 or the like.

After the second arm plate 28 of the roller arm unit 10, as a sole component, is slidably engaged with the guide rail 15, and the second arm plate 28 is fixed to the first arm plate 26 with the bolts 27. Then, each tip end of the door-opening cable 20 and the door-closing cable 21 is fixed to the portions near the front and rear portions of the guide-rail 15.

Although the roller arm unit 10 is swung counterclockwise when the roller arm unit 10 passes through the curved portion 22 formed in the guide rail 15 in the opening direction and is swung clockwise when the roller arm unit 10 passes through the curved portion 22 in the closing direction, in the present invention, it is arranged that the contact surface (the take-up side contact angle) between the third pulley 13 and the cable 20 or 21 as a take-up side cable becomes gradually smaller and the contact surface (the payed-out side contact angle) between the third pulley 13 and the cable 21 or 20 as a payed-out side cable becomes gradually larger. For this reason, the cable 20 or 21 as a take-up side cable is not pulled by the increasing of path length of the take-up side cable even if the roller arm unit 10 passes through the curved portion 22, and it can be prevented that an additional load is applied to the wire drum 19 (the power unit 18). Moreover, since the sliding resistance of the sliding door 17 becomes maximum when the roller arm unit 10 is passing through the curved portion 22, the prevention of the increase of the resistance at the time of the roller arm unit 10 passing through the curved portion 22 carries out the stable sliding movement of the slide door 17, and gives a surplus power to the power unit 18.

Figure 10:
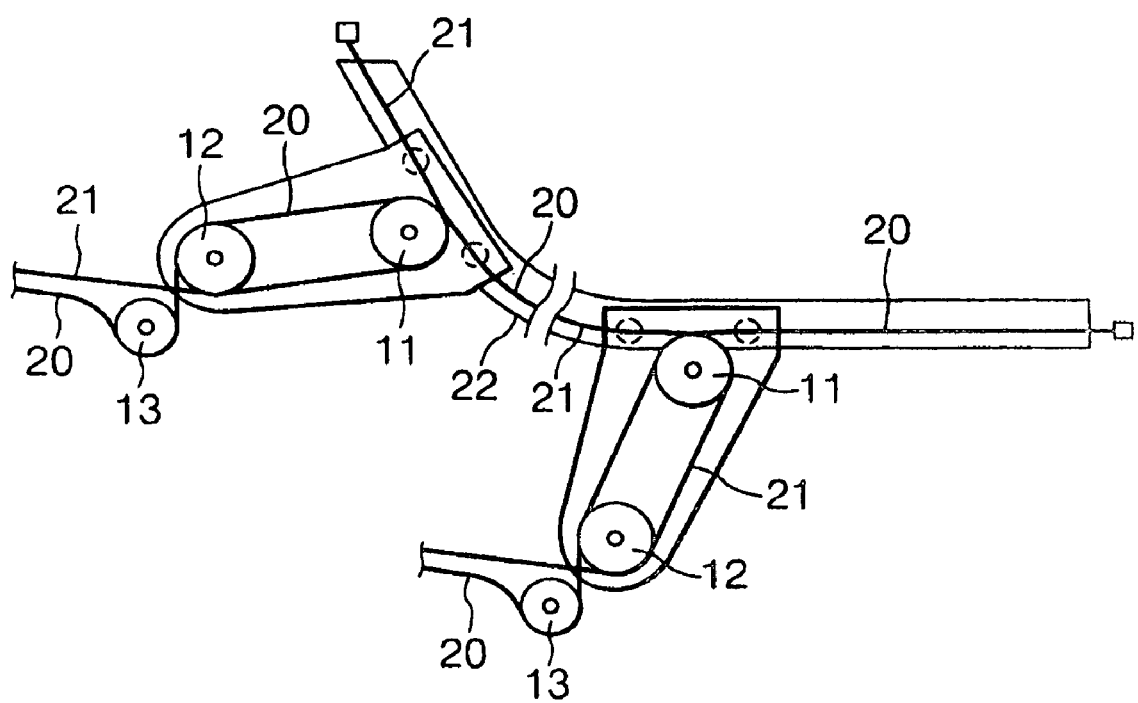
FIG. 10 is a schematic view showing a roller arm unit in accordance with another embodiment of the present invention.

In the second embodiment of the present invention as shown in FIG. 10, the third pulley 13 is rotatably mounted on the sliding door 17 (or the vehicle body 14) directly, and, the roller arm unit 10 is arranged such that the unit 10 can be swung about the axis of the second pulley shaft 35 of the second pulley 12. Moreover, the door-opening cable 20 and the door-closing cable 21 are intersected with each other only between the second pulley 12 and the third pulley 13, and are not intersected with each other between the first pulley 11 and the second pulley 12.

In this embodiment, when the roller arm unit 10 is swung, the contact surface (the take-up side contact angle) between the second pulley 12 and the cable 20 or 21 as a take-up side cable becomes small gradually and the contact surface (the pay-out side contact angle) between the second pulley 12 and the cable 21 or 20 as a pay-out side cable becomes large gradually.

Advantages

In this invention, even if the roller arm unit 10 is swung when moving around the curved portion 22, the total path length does not change, and the path length of the take-up side cable becomes shorter in comparison to the prior art device. Therefore, it can be prevented that the swinging movement of the roller arm unit 10 applies the wire drum 19 (the power unit 18) to undesirable load.

What is claimed is:

1. A vehicle device comprising:
a guide rail attached to a vehicle body and having a curved portion;
a roller arm unit rotatably mounted on a sliding door, said roller arm unit having cable pulley means and rollers slidably engaged with the guide rail;
said pulley means having at least three pulleys;
a power unit provided in the sliding door;
a door-opening cable (20) extending from the power unit engaging an upper portion of a rim of a first pulley of said three pulleys, the first pulley coaxially mounted with the roller arm unit on the sliding door;
said door opening cable having a first tip end fixed to a portion of the vehicle body adjacent to a first end of the guide rail and distal from a door opening of the vehicle by way of the cable pulley means, said door-opening cable being configured to slide the sliding door in a door-opening direction by being taken up by the power unit while a door closing cable is payed out from the power unit;
a door-closing cable (21) extending from the power unit engaging a lower portion of the rim of the first pulley and having a second tip end fixed to a portion of the vehicle body adjacent to a second end of the guide rail and proximate to the door opening by way of the cable pulley means, said door-closing cable being configured to slide the sliding door in a door-closing direction by being taken up by the power unit while the door-opening cable is payed out from the power unit;
said first pulley located on said roller arm unit relative to the guide rail and the first tip end so that when said door-opening cable and door-closing cable are engaged on said three pulleys a length of the door-opening cable contacting the upper portion of the rim of the first pulley becomes shorter as it is taken up by the power unit while the roller arm unit is moving around the curved portion and the door-closing cable contacting the lower portion of the rim of the first pulley becomes longer as it is payed out by the power unit while the roller arm unit is moving around the curved portion; and
wherein the change of said lengths contacting the rim of the first pulley prevent an additional load being applied to the wire drum as the roller arm unit moves around the curved portion.

2. A vehicle device comprising:
a guide rail attached to a sliding door and having a curved portion;
a roller arm unit rotatably mounted on a vehicle body, said roller arm unit having cable pulley means and rollers slidably engaged with the guide rail;
said pulley means having at least three pulleys;
a power unit provided in the vehicle body;
a door-opening cable (20) extending from the power unit engaging an upper portion of a rim of said three pulleys, a first pulley coaxially mounted with the roller arm unit on the vehicle body, said door-opening cable having a tip end fixed to a portion of the sliding door adjacent to a first end of the guide rail and proximate to a door opening of the vehicle by way of the cable pulley means, said door-opening cable being configured to slide the sliding door in a door-opening direction by being taken up by the power unit while a door-closing cable is payed out from the power unit;
a door-closing cable (21) extending from the power unit engaging an upper portion of the rim of the first pulley and having a tip end fixed to a portion of the sliding door adjacent to a second end of the guide rail and distal from the door opening by way of the cable pulley means, said door-closing cable being configured to slide the sliding door in a door-closing direction by being taken up by the power unit while the door-closing cable is payed out from the power unit;
wherein said first pulley is located on said roller arm unit relative to the guide rail and the first tip end so that when said door-opening cable and door-closing cable are engaged on said three pulleys a length of the door-opening cable contacting the upper portion of the rim of the first pulley becomes shorter as it is taken up by the power unit while the roller arm unit is moving around the curved portion and a length of the door-closing cable contacting the lower portion of the rim of the first pulley becomes longer as it is payed out by the power unit while the roller arm unit is moving around the curved portion; and
wherein the change of said lengths contacting the rim of the first pulley prevent an additional load being applied to the wire drum as the roller arm unit moves around the curved portion.

3. The vehicle device according to claim 1, said door-opening cable and said door-closing cable arc intersected with each other between two neighboring pulleys.

4. The vehicle device according to claim 2, said door-opening cable and said door-closing cable are intersected with each other between two neighboring pulleys.

* * * * *